United States Patent
Brady et al.

(10) Patent No.: US 9,476,760 B2
(45) Date of Patent: Oct. 25, 2016

(54) PRECISION MEASUREMENTS IN A FIBER OPTIC DISTRIBUTED SENSOR SYSTEM

(75) Inventors: Dominic Brady, Freemantle (GB); Arthur H. Hartog, Winchester (GB)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 694 days.

(21) Appl. No.: 12/823,685

(22) Filed: Jun. 25, 2010

(65) Prior Publication Data

US 2011/0320147 A1 Dec. 29, 2011

(51) Int. Cl.
  *G01R 29/00* (2006.01)
  *G01H 9/00* (2006.01)
  *G01V 1/40* (2006.01)

(52) U.S. Cl.
  CPC ............. *G01H 9/004* (2013.01); *G01V 1/40* (2013.01)

(58) Field of Classification Search
  CPC ...................................... G01H 9/004
  USPC .............. 702/66, 57, 72; 385/12, 13, 76, 55; 356/447, 446, 445, 477
  See application file for complete search history.

(56) References Cited

U.S. PATENT DOCUMENTS

| | | | |
|---|---|---|---|
| 5,194,847 A | 3/1993 | Taylor | |
| 6,205,263 B1* | 3/2001 | Lieberman | G01N 21/7703 250/227.14 |
| 7,586,617 B2 | 9/2009 | Hartog et al. | |
| 7,668,411 B2 | 2/2010 | Davies et al. | |
| 2006/0066839 A1 | 3/2006 | Payton | |
| 2006/0115204 A1* | 6/2006 | Marsh | E21B 47/065 385/12 |
| 2007/0126594 A1 | 6/2007 | Atkinson et al. | |
| 2008/0278711 A1 | 11/2008 | Sikora | |
| 2009/0114386 A1* | 5/2009 | Hartog et al. | 166/250.08 |
| 2009/0132183 A1* | 5/2009 | Hartog et al. | 702/42 |
| 2009/0323075 A1 | 12/2009 | Brady | |
| 2010/0092176 A1 | 4/2010 | Hartog et al. | |
| 2010/0117830 A1 | 5/2010 | Strong et al. | |

FOREIGN PATENT DOCUMENTS

| | | |
|---|---|---|
| GB | 2126820 | 3/1984 |
| GB | 2222247 | 2/1990 |
| GB | 2438432 A | 11/2007 |
| JP | 2009-020003 A | 1/2009 |
| JP | 2009020003 A * | 1/2009 |

(Continued)

OTHER PUBLICATIONS

Dakin, J.P. and P.B. Withers, The reduction of semiconductor laser phase noise for sensor applications. Optica Acta, 1986 33(4) p. 489-99.

(Continued)

*Primary Examiner* — Sujoy Kundu
*Assistant Examiner* — Ricky Ngon
(74) *Attorney, Agent, or Firm* — Dave J. Groesbeck

(57) ABSTRACT

A fiber optic distributed vibration sensor provides a highly sensitive measurement of a measurand with a high degree of linearity. The distributed vibration sensor includes subsections configured to have a high sensitivity to a measurand of interest interspaced in an alternating manner with subsections having a low sensitivity to the measurand. The distributed vibration sensor is interrogated such that a phase difference between the backscattered signals generated in low sensitivity subsections surrounding a high sensitivity subsection can be determined. Characteristics of the measurand may then be determined based on the phase difference.

26 Claims, 3 Drawing Sheets

(56) References Cited

FOREIGN PATENT DOCUMENTS

WO 2006048647 11/2006
WO 2010/053931 A1 5/2010

OTHER PUBLICATIONS

Cranch, G.A. and P. J. Nash, High-responsivity fiber-optic flexural disk accelerometers. Journal of Lightwave Technology, 2000 18(9); p. 1233-1243.

Nash, P., Review of intrferometric optical fibre hydrophone technology. IEE Proceedings on Radar, Sonar and Navigation. 1996. 143(3); p. 204-209.

Giallorenzi, T., et al. Optical fiber sensor technology. Quantum Electronics, IEEE Journal of 1982. 18(4); p. 626-665.

International Search Report and Written Opinion dated Dec. 19, 2011 for corresponding PCT Application No. PCT/US2011/033844 filed Apr. 26, 2011.

PCT/US11/33844, International Preliminary Report on Patentability, dated Jan. 10, 2013, 5 pgs.

* cited by examiner

PRECISION MEASUREMENTS IN A FIBER OPTIC DISTRIBUTED SENSOR SYSTEM

BACKGROUND

The advantages of fiber optic distributed measurement systems are substantial, including the ability to measure parameters of interest at large numbers of spatially distinct points over great distances. Exemplary measurands may include temperature, pressure, strain and disturbances of unknown natures.

Despite the benefits of distributed sensors, there are many instances where it may be desirable to improve the transduction from the measurand to the resultant optical signal and provide a much more specific and sensitive response. In addition to reducing the cross-sensitivity to other measurands, a more specific and sensitive response may provide information regarding certain characteristics of the measurand that otherwise may not be available. For instance, while a distributed vibration sensor may provide information to indicate the presence of a disturbance at a particular location, the measurement may not provide quantitative or directional information, thus potentially limiting a distributed system's usefulness in systems in which such parameters are of interest. Another limitation of distributed sensing systems can be the poor linearity of their response to a measurand (i.e., the transduction from the measurand to the generated optical signal) which also places constraints on the quality of the measurements that may be obtained.

BRIEF DESCRIPTION OF THE DRAWINGS

Some embodiments are described with respect to the following figures.

DETAILED DESCRIPTION

Figure 1:
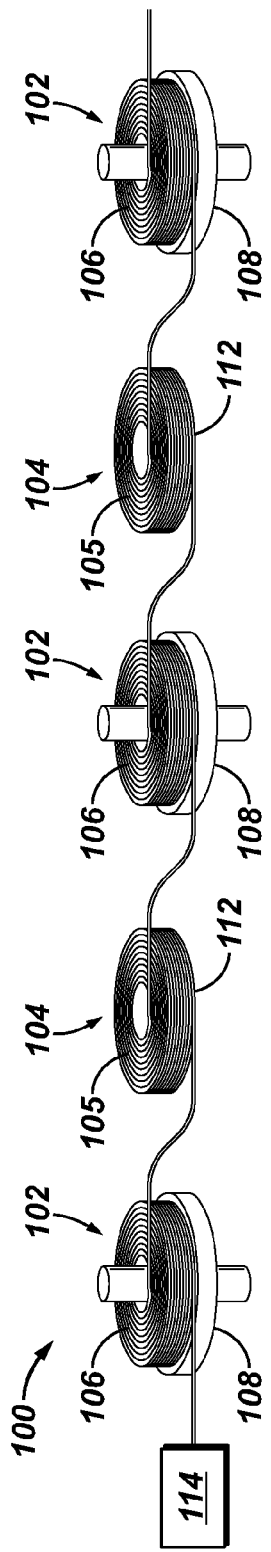
FIG. 1 illustrates an exemplary distributed vibration sensor with alternating sections of contrasting sensitivity to a measurand, in accordance with an embodiment of the invention.

Embodiments of the invention employ a fiber optic distributed disturbance sensor to provide highly sensitive, precision measurements with a high degree of linearity together with a distributed measurement.

In general, the linearity of the measurement that may be obtained by a fiber optic distributed vibration sensor (DVS) is limited. In the simplest implementation of a DVS system, a narrowband optical source (e.g., laser) is modulated to produce an optical pulse which is launched into an end of the optical fiber. The duration of the optical pulse determines the spatial resolution of the system. The length of fiber occupied by the optical pulse at any one time in its two-way trip is referred to as a resolution cell, or simply a cell. As the optical pulse travels along the sensing fiber, some of its energy is scattered. A portion of that scattered light is captured by the guiding structure that is the fiber and guided back towards the launching end of the fiber, where it is detected by a photodetector and converted to an electrical signal. The electrical signal generally is further processed, typically by conversion to digital form in an analog-to-digital converter and subsequent processing in the digital domain.

In general, the feature that distinguishes a DVS system from a conventional optical time domain reflectometry (OTDR) system is the narrowband nature of the launched pulse that is used to interrogate the fiber. If the spectral width of the interrogating pulse is wide (as is typical in OTDR systems), then the optical signals that are re-radiated from scattering centers (i.e., elemental sections) located within the resolution cell of the fiber are in a random phase relative to other elemental sections. As a result, the optical signal from each portion of a resolution cell that corresponds to the duration of the pulse may be added in intensity (i.e., the total intensity detected for that cell is equal to the sum of the intensities contributed from each elemental section of the cell).

In contrast, in a DVS system, the optical source used to generate the interrogating pulse has a coherence length that is longer than the section of fiber corresponding to the duration of pulse (the pulse duration being related to the length of the section illuminated by the pulse by the two-way speed of light in the fiber, approximately 0.1 meter/nanosecond). As a result, in a DVS system, the light returning from each elemental section is coherently related to all elemental sections within the cell. Thus, the optical signals generated by the fiber must be added as an electric field. Consequently, the phase relationship between the elemental sections of the cell is critical to the total intensity of the light collected from that cell. Each resolution cell thus acts as a multi-path interferometer, and the returned optical signal depends on the frequency of the laser and the random arrangement of scattering centers within the cell. For a fixed laser frequency and a stable arrangement of scatterers within the cell, the returned optical signal is random, but stable. If, however, the arrangement of the scatterers is disturbed, e.g., by stretching/straining the fiber, then the returned optical signal is altered. This phenomenon is used by the DVS system to detect a disturbance. However, the transfer function between strain and the returned signal can be highly non-linear. Because of the jagged appearance of the Rayleigh backscatter signal as a function of distance along the fiber, when generated by a narrowband source, it is sometimes referred to as coherent Rayleigh noise.

Nonetheless, the inventors have recognized that, in some instances, a linear response can be achieved by interrogating and acquiring the optical signals from the optical fiber in particular manners. One example of an interrogation and acquisition technique that can yield a linear response makes use of the phase of the scattered light by means of coherent detection. In this example, a linear response is accomplished by launching two optical pulses of different frequency at slightly different times. The resultant backscattered signal thus contains a difference-frequency corresponding to the beating of backscatter from the two pulses. The phase of this beat frequency is proportional to the optical distance between backscattering regions defined by the time separating the two pulses. Thus, if only the section of fiber between the sections occupied by the two interrogating pulses is strained, then the relationship between strain and phase at the beat frequency is linear. However, it should be recognized that the phase of the scattered signal from each resolution cell is dependent on the distribution of scatterers and optical carrier frequency in the same manner as a total intensity is. Thus, if either or both of the cells from which the pulses are scattered is (are) disturbed, then the phase of one or both of the backscattered signals will be altered, which, in turn, degrades the linearity of the response of the DVS system.

Another coherent detection technique that can also provide a linear response uses an optical source to launch only one interrogating pulse into the fiber, and then mixes the backscatter with a continuous fraction of the light emitted by the optical source. This fraction of light is typically referred to as the local oscillator. In general (but not necessarily), this type of coherent detection scheme arrangement imposes a frequency difference between the interrogating pulse and the local oscillator (e.g., by shifting either the interrogating pulse or the local oscillator signal using an acousto-optic modulator). A beat frequency is then found where the backscatter mixes with the local oscillator at a photodetector. The phase difference between any two sections of fiber (determined by the time delay between those sections) can thus be calculated and used to track changes of strain in the region of fiber between the two sections. Again, if those two sections of fiber are undisturbed, a high quality, low distortion reading of the change of strain in the region of fiber between the two sections may be obtained.

The above-described techniques for obtaining a linear response from a DVS system require extracting responses from undisturbed sections of the fiber that surround (but are not necessarily adjacent to) the strained section. However, in practice, there is no certainty that there will be undisturbed regions of fiber and, thus, no certainty that a linear response from the system may be obtained.

However, the inventors have discovered that a linear response can be approximated by providing a fiber optic distributed vibration sensor with interspaced sections or regions of contrasting sensitivity to the measurand of interest. Because of the linear response that may be provided by the sensor, a DVS system having such a sensor may provide accurate and highly specific distributed or quasi-distributed measurements over great distances. In illustrative embodiments, this result is achieved by a fiber optic distributed vibration sensor in which regions of high sensitivity to a measurand are interspaced with regions of low sensitivity to the measurand in an alternating manner. The improvement in linearity achieved is directly proportional to the ratio of the sensitivity of the high and low sensitivity regions and is inversely proportional to the ratio of the duration of the interrogating pulses to the two-way transit time between low-sensitivity regions. In practice, improvements in linearity of one to at least two orders of magnitude have been achieved, compared with the case of a uniform sensitivity distribution and pulse durations equal to the differentiating interval.

The distributed sensor configured in this manner preferably may be interrogated using distributed interrogation techniques such that the difference in phase of the optical signals obtained from low sensitivity regions straddling a region of high sensitivity may be formed. Based on this phase difference, characteristics relating to a measurand of interest may be extracted. In some embodiments, the low sensitivity regions may be adjacent to the high sensitivity regions. Alternatively, the low sensitivity regions may surround the high sensitivity regions, but may not be immediately adjacent.

In some embodiments, the high sensitivity regions can be achieved by coupling the optical fiber to transducers and/or including various materials that enhance the sensitivity of the optical fiber to a particular measurand. The low sensitivity regions in such embodiments can simply be regions of fiber that have not been subjected to an enhancement process. Alternatively, the low sensitivity regions can be regions where active steps have been taken to reduce sensitivity to a measurand, such as by including materials that shield those sections of the optical fiber from the measurand.

As an example, and with reference to FIG. 1, a fiber optic distributed vibration sensor 100 includes a plurality of fiber optic accelerometers 102 (i.e., the high sensitivity regions) coupled together with sections 104 of fiber 105 (i.e., the low sensitivity regions) in between. Each fiber optic accelerometer 102 may comprise several tens of meters (e.g., 50-200 meters) of optical fiber 106 coiled and attached to a flexural disk 108. The coiled sections of fiber 106 may be spliced or otherwise connected together with a few meters (e.g., 1-10 meters) of optical fiber 105 unattached to a flexural disk between each accelerometer section. In some embodiments, the sections 104 of unattached optical fiber 105 may also include a coating or jacket 112 that shields or actively protects the fiber 105 from the measurand (i.e., the disturbance). As shown in FIG. 1, an interrogation system 114 for launching optical pulses, detecting backscattered optical signals, and acquiring data from the backscatter that corresponds to the measurand is coupled to an end of the fiber optic distributed vibration sensor 100.

Figure 2:
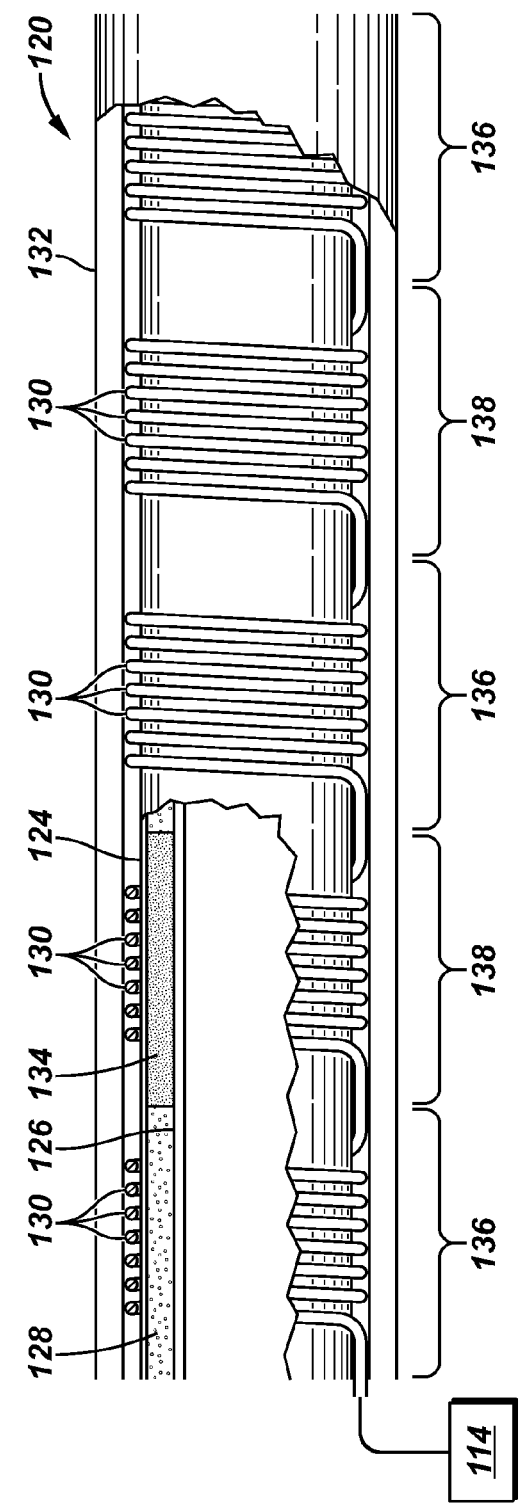
FIG. 2 illustrates another exemplary distributed vibration sensor with alternating sections of contrasting sensitivity to a measurand, in accordance with an embodiment of the invention.

Another exemplary embodiment of a fiber optic distributed vibration sensor 120 having regions of contrasting sensitivity to a measurand is shown in FIG. 2. In this example, the distributed vibration sensor 120 is configured to be sensitive to dynamic pressure variations and includes alternating sections where the optical fiber is highly exposed to pressure variation with sections where the optical fiber is shielded from such variations. The sensor 120 shown in FIG. 2 may be particularly useful as a sensor array that is towed by a ship for conducting subsea seismic explorations.

With reference to FIG. 2, the fiber optic distributed sensor 120 is a cable having a thin wall 124 separated from a stiffer layer 126 by a highly compliant region 128. In this example, the highly compliant region 128 includes a foam or a webbed structure such that the compliant region 128 is filled primarily with air. The optical fiber 130 is wound helically about the compliant region 128 and oversheathed with a membrane 132 for protection from abrasion, chemical attacks, and other threats, thus forming highly sensitive regions 136. In sections 138 of the cable 120, a solid material 134 replaces the air-filled material so that the compliance in these sections 138 is substantially less than that of the sections 136 that primarily contain air. For instance, hydrophones formed on an air-filled mandrel (i.e., highly sensitive sections 136) can achieve an enhancement of sensitivity of around a factor of 100 relative to a solid cable (i.e., sections 138).

As a result, the cable 120 includes sections 136 of high sensitivity to pressure (i.e., the sections where the fiber is wound about the air-filled region) interspaced with sections 138 of low sensitivity to pressure (i.e., the sections that include the solid material). The ratio of the length of fiber 130 in the high sensitivity sections 136 to the length of the fiber 130 in the low sensitivity sections 138 may be varied as appropriate to optimize system performance. As an example, the ratio of the lengths of the fiber 130 may be in the range of 10 to 100. This, together with an interrogating pulse duration occupying a fiber length less than that of the low-sensitivity region 138, provides an improvement in the linearity of the measurement directly proportional to the ratio of the lengths of high and low-sensitivity regions 136 and 138. As a result, improvements in linearity on the order of 100 may be achieved. In some embodiments, the manner in which the optical fiber 130 is wound may also be varied between the various sections 136 and 138 as may be desired to address noise concerns (e.g., flow noise).

The foregoing examples of fiber optic distributed vibration sensors having interspaced high and low sensitivity regions are illustrative only. It should be understood that other methods for enhancing the sensitivity of selected sections of the cable to the measurand and/or for reducing the sensitivity of selected sections of the cable to the measurand—and thus for improving the sensitivity and linearity of the system's response—are also contemplated and within the scope of embodiments of the invention described herein.

A distributed vibration sensor may provide information about disturbances at any and every location along the length of the optical fiber. Thus, when discrete transducers are incorporated onto the optical fiber of the distributed sensor, an interrogation and acquisition system that is based on distributed sensing can also be used to provide information about each individual transducer. The ability of the distributed system to operate in this manner may facilitate design validation and production testing scenarios, since the ability to address each individual transducer along the fiber may be used for uniformity checks, defect identification, and so forth. However, the benefit that may be obtained from a distributed sensor system that is configured in accordance with embodiments of the invention may be even more significant when the system is employed in an operational environment.

To illustrate, many interferometric sensors are limited in their dynamic range by the maximum number of fringes that they can acquire and track in a given time interval. In general, the response of an interferometric sensor is a periodic function of the measurand. Thus, an unwrapping operation is required to retrieve the measurand from the signal generated by the interferometric sensor. Unwrapping algorithms generally are limited in the maximum rate of change of phase that they can process (typically $\pi$ radians between sample points). Thus, the maximum signal that can be reliably read is limited by the number of fringes per second in relation to the sampling rate, which sets the upper end of the dynamic range of the sensor. The lower end of the dynamic range is limited by noise considerations. However, using exemplary distributed interrogation approaches described herein to acquire information from a distributed sensor which also includes discrete transducers increases this dynamic range.

More particularly, the distributed interrogation techniques of the exemplary fiber optic sensors described herein effectively allow subsections of the precision sensors (i.e., the high-sensitivity sections) to be interrogated separately. If the subsections of the precision sensors that are selected for interrogation have a lower sensitivity to the measurand relative to the full sensitivity of the discrete transducers, then the interrogation of the distributed/full system/precision sensor may be carried out at a lower rate of fringes per sampling intervals. The information gleaned from processing the signals from small subsections of the precision (i.e., high-sensitivity) sensors may then be used to assist the unwrapping of the more linear and larger signal excursions of the phase difference obtained from low-sensitivity regions surrounding the high-sensitivity, precision sensors. Consequently, the dynamic range of the transducers may be increased roughly in proportion to the ratio of the length of the fiber used for the transducer to the spatial resolution of the distributed interrogation system. In some cases, the precision sensors may have a non-linear response as a function of the position along the fiber, in order to further extend the dynamic range of the system when used as described in this paragraph.

As an example, if the length of the fiber wound onto a transducer is on the order of 50-200 meters, and the spatial resolution of the distributed interferometric interrogation system is on the order of a few meters, then the dynamic range of the transducers may be increased by one to two orders of magnitude. Alternatively, the increase in dynamic range may be used to reduce the sample rate (i.e., the repetition frequency of the interrogating pulse), thus providing for extension of the sensing range of the distributed sensor without adversely affecting performance.

In some embodiments, the separately interrogated subsections may be contained entirely within a particular high-sensitivity region of the fiber optic sensor and each subsection may have the same length. Alternatively, the length of the subsections may vary as may be needed to assist with the unwrapping of the phase difference obtained between the surrounding low-sensitivity regions. For instance, the length of the interrogated subsections may become progressively longer or shorter as needed to guide the unwrapping. Yet further, the subsection may straddle low and high-sensitivity regions such that a portion of the subsection has a low sensitivity to the measurand while another portion of the subsection has a high sensitivity to the measurand.

Figure 3:
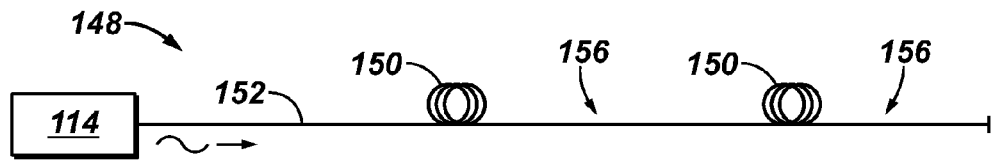
FIG. 3 illustrates an exemplary interrogation technique for acquiring a measurement from a distributed vibration sensor with alternating sections of contrasting sensitivity to a measurand, in accordance with an embodiment of the invention.
Figure 4:
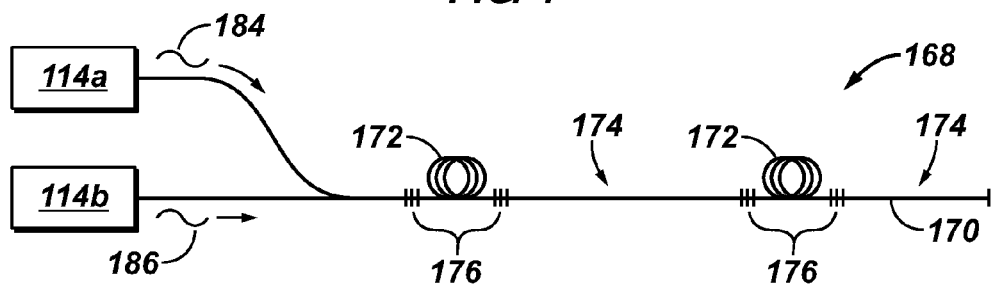
FIG. 4 illustrates another exemplary interrogation technique for acquiring a measurement from a distributed vibration sensor with alternating sections of contrasting sensitivity to a measurand, in accordance an embodiment of the invention.
Figure 5:
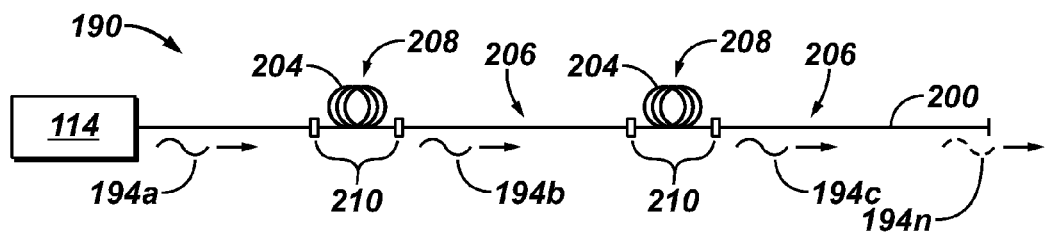
FIG. 5 illustrates yet another exemplary interrogation technique for acquiring a measurement from a distributed vibration sensor with alternating sections of contrasting sensitivity to a measurand, in accordance with an embodiment of the invention.

Implementations of exemplary interrogation and acquisition techniques are illustrated in FIGS. 3-5 and may be used with a fiber optic distributed vibration sensor that includes precision or discrete sensors installed along its length. In general, a distributed measurement may be obtained from a fiber optic sensor by detecting coherent Rayleigh noise (CRN) present in a backscattered optical signal that has been generated by scattering centers of the fiber in response to interrogating optical pulses that have been launched into the fiber. It should be understood, however, that other suitable techniques for acquiring a distributed measurement in accordance with embodiments of the invention also are contemplated.

With reference first to FIG. 3, a distributed sensing system 148 includes one or more discrete or precision optical fiber sensors 150 installed into a fiber optic sensor cable 152 in which the sensing optical fiber is configured to respond to a disturbance that may be incident at any location along the length of the cable 152. In one embodiment, each precision sensor 150 includes a length of the sensing fiber which is coiled about and coupled to an appropriate transducer (e.g., a flexural disk, air-filled mandrel, etc.) so that the precision sensor 150 is highly sensitive to the measurand of interest. The precision sensor 150 also may be configured such that influences which compete with the measurand have a substantially smaller impact or are actively suppressed. In some embodiments, the sensitivity of the precision sensor 150 to the measurand may be one to two orders of magnitude greater than the sensitivity of an unwound section of the sensing fiber, such as sections 156.

In this embodiment, the measurement of the response of the precision sensors 150 may be performed at the same modulation frequency, wavelength and sensing interval as the measurement of the distributed response of the sensing fiber and is effectively included with the distributed measurement. Thus, the same interrogation and acquisition system 114 may be used to perform both measurements, with the advantages previously described.

Interrogation and acquisition system 114, which is coupled to the sensor cable 152 (or, in other embodiments, to any of sensor cables 170, 200, 286), may be any type of suitable arrangement that is configured to determine the change in phase of the backscattered light between two sections of fiber, including, but not limited to, any of the coherent detection techniques discussed above, other narrowband techniques, and broadband and spread-spectrum techniques. The optical source used to generate the interrogating pulse of light need only be appropriate for the particular distributed interrogation technique (including narrowband, broadband and spread-spectrum techniques) that is used, as well as the particular configuration of the distributed vibration sensor 152 (or sensors 170, 200, 286).

Figure 6:
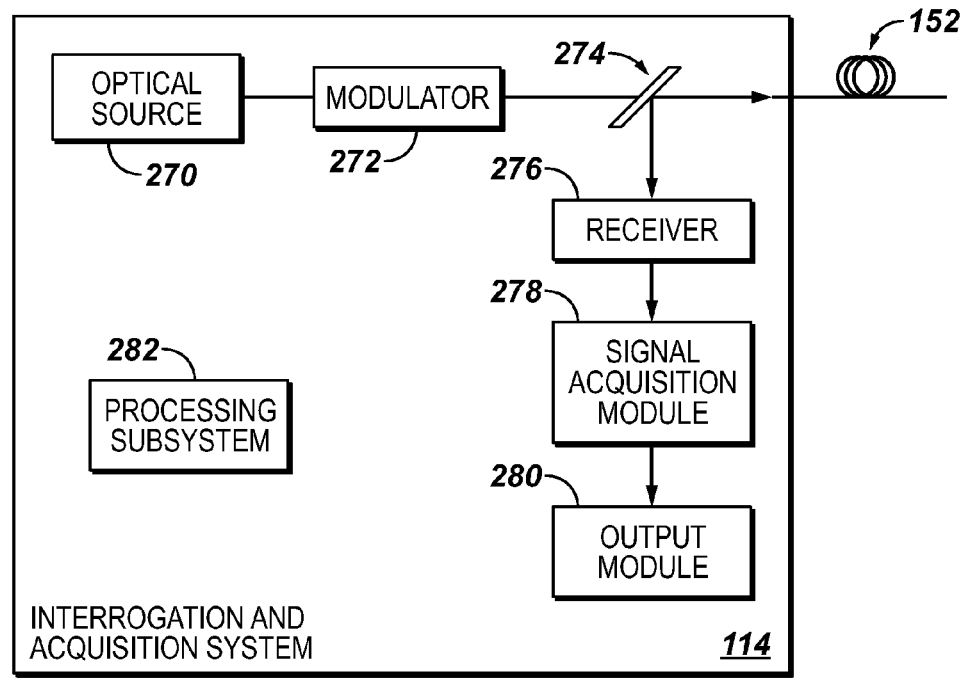
FIG. 6 is an exemplary interrogation and acquisition system, in accordance with an embodiment of the invention.

For example, as shown in FIG. 6, the interrogation and acquisition system 114 can include an optical source 270 to generate an optical signal (e.g., an optical pulse or series of pulses) to launch into the fiber optic sensor cable 152. In some embodiments, the optical source 270 may be a narrowband laser that is followed by a modulator 272 that selects short pulses from the output of the laser. The optical signal or pulses generated by the optical source 270 are launched into the optical fiber cable 152 though a directional coupler 274, which separates outgoing and returning optical signals and directs the returning (backscattered) signals to an optical receiver 276. The directional coupler 274 may be a beam splitter, a fiber-optic coupler, a circulator, or some other optical device.

The backscattered optical signals generated by the fiber optic sensor 152 in response to the interrogating optical signal may be detected and converted to an electrical signal at the receiver 276. This electrical signal may be acquired by a signal acquisition module 278 (e.g., an analog-to-digital converter) and then transferred as data representing the backscattered signals to an output module 280 for outputting the data to a processing subsystem 282. The processing subsystem 282 may include various algorithms to process the data to determine characteristics of the measurand. As example, the processing subsystem 282 may include algorithms to determine the phase difference between the signals generated in the low-sensitivity regions surrounding a high-sensitivity region, as well as an algorithm that uses a response obtained from a subsection of the high-sensitivity region to guide unwrapping of the phase difference. In some embodiments, the processing system 282 may also include algorithms to control the optical source 270 so that the source 270 emits optical pulses or series of pulses having characteristics that are suitable for the particular interrogation technique and for the particular configuration of the sensor cable that are employed.

With reference again to FIG. 3, while the system shown in FIG. 3 may be relatively simple to implement, the distance over which the distributed measurement may be made may be limited by the dynamic range of the precision sensors 150, even accounting for the advantages discussed above. More particularly, precision optical fiber sensors of the type that may be employed in the system 148 of FIG. 3 act to change the phase of the light incident on them. Because optical phase is not single valued, the measurement should be tracked to ensure that interference fringes are not missed. The need to track the measurement places a minimum requirement on the sample frequency that may be used for any given precision sensor and dynamic range requirement, thus limiting the distance over which the distributed measurement may be made (referred to as the "distributed system length" or DSL). For instance, at a 10 kilohertz (kHz) sampling frequency the DSL of the system 148 would be limited to 10 kilometers. A 50 kHz sampling frequency would limit the DSL to 2 kilometers, and so forth. Thus, the system 148 of FIG. 3 may be best suited for applications that do not require a lengthy DSL.

In some embodiments, the DSL may be increased by using the arrangement 168 shown in FIG. 4. In this example, a fiber optic sensing cable 170 is configured as a distributed vibration sensor having precision sensors 172 that alternate with sections 174 of low sensitivity to the measurand. In this embodiment, the cable 170 further includes wavelength selective elements 176 (e.g., fiber Bragg gratings) to mark the start and end of each precision sensor 172. In this manner, the optical wavelength to which the precision sensors 172 respond is different than the optical wavelength of the light used for the distributed measurement. Thus, the limitation on DSL that was present in the system 148 of FIG. 3 due to the dynamic range limitations of the precision sensors 150 may be overcome.

However, in the system 168 of FIG. 4, while the same optical fiber 170 may be used for both the precision measurements and the distributed measurement, separate interrogation and acquisition systems 114a and 114b are coupled to the fiber so that the measurements can be made at different optical wavelengths. Thus, the system 114a generates first optical pulses 184 having a particular optical wavelength, and these pulses 184 are launched into the fiber 170 for interrogation of the precision sensors 172. System 114b generates second optical pulses 186 having a different optical wavelength, and these pulses 186 are launched into the fiber 170 for making the distributed measurement. Again, the interrogation and acquisition systems 114a and 114b may be configured in any of a variety of manners that are suitable for launching interrogating optical pulses at the appropriate wavelengths and determining the change in phase of the backscattered light between two sections of fiber. For instance, in some embodiments, systems 114a and 114b may share an optical source 270 that is adjusted to emit optical pulses at different wavelengths, while in other embodiments, the optical source 270 may include separate lasers for emitting the different pulses.

FIG. 5 illustrates yet another exemplary embodiment of a distributed vibration sensing system 190 for performing precision measurements. The system 190 shown in FIG. 5 employs only a single interrogation and acquisition system 114 but still may offer improved DSL for the distributed measurement and/or dynamic range for the precision measurement as compared to the system 148 of FIG. 3. The system 190 includes a fiber optic distributed sensor 200 including an optical fiber and a plurality of discrete optical sensors 204 arranged to form low sensitivity regions 206 interspaced in an alternating manner with high sensitivity regions 208.

In this example, each of the interrogating pulses 194a, 194b, 194c and 194n generated by the optical source 270 in the interrogating and acquisition system 114 has at least one unique characteristic, e.g., a unique wavelength, frequency, and/or polarization. In this context, the usage of the terms "frequency" and "wavelength" is distinguished according to the magnitude of the difference in optical carrier frequency. More particularly, the term "frequency" is used in conjunction with changes in the optical carrier frequency that are sufficiently small that the signals may be separated using electrical filters and/or in implementations in which the system designer chooses to use electrical separation. In contrast, when the separation between signals arising from the different pulse types is performed in the optical domain, the term "wavelength" is used. Regardless of whether optical or electrical separation techniques are employed, the use of pulses having a unique characteristic allows any individual pulse 194a-n to be separately identified from any other pulses 194a-n that may exist concurrently within the optical fiber 200. Consequently, the number of interrogating pulses 194a-n in the fiber 200 at any one time may be increased beyond the limitations that would otherwise be imposed by DSL and/or dynamic range considerations.

In this embodiment, the sensor 200 is interrogated using sets of pulses of the 194a, 194b etc types. For example, a first sequence of pulses 194a, 194b, 194c . . . 194n may be launched following by a second sequence of pulses 194a-n, where each of the pulses 194 in a sequence is different from the other pulses 194 in that sequence. All pulses 194 and the resulting backscatter from the pulses 194 are then collected in sets corresponding to each pulse type. For instance, a first set of pulses includes all pulses 194a and the backscatter generated in response to the pulses 194a. A second set of pulses includes all pulses 194b and the backscatter generated in response to the pulses 194b, and so forth. Each set of collected pulses and corresponding backscatter are processed as a set, and the resulting processed data may then be aggregated in a further signal processing step in order to determine characteristics of the measurand of interest.

More particularly, because each of the optical pulses 194a-n has a unique characteristic, the backscattered interferogram is similarly unique for each pulse 194a-n and uncorrelated with interferograms resulting from pulses 194a-n having different characteristics. The backscattered optical signals resulting from the different interrogating pulses 194a-n may be demultiplexed when received by the interrogation and acquisition system 114. For instance, if the unique characteristic is optical wavelength or polarization, then optical techniques may be used to separate the received backscattered signals that correspond to the different interrogating pulses. In such a case, the backscattered signal may be optically separated into separate signals and the separate signals may then be directed to separate detectors and acquisition systems. However, if the unique characteristic is frequency, then electrical techniques may be used to demultiplex the received backscattered signals. In such a case, a single electrical signal may be acquired from the backscattered signal and the multiple channels separated by signal processing using the same acquisition system. As an example, if the acquisition system has a bandwidth of 1 GHz, and the spectrum of the backscattered light occupies less than 100 MHz, then ten distinct pulses may be propagated simultaneously in the optical fiber 202 without confusion.

Regardless of which unique characteristic is used, in the system 190 of FIG. 5, the interferogram corresponding to a unique pulse (e.g., pulse 194a) in a sequence of pulses 194a-n is correlated with interferograms corresponding to the same type of pulse (e.g., pulses 194a) in the immediate preceding sequence of pulses 194a-n and in the immediate following sequence of pulses 194a-n. In one embodiment, correlation may be facilitated by including reference sections 210 of fiber before and after each precision sensor 204 to provide a low noise baseline against which the phase of each pulse 194a-n may be measured. As examples, the reference sections 210 may include a length of insensitive optical fiber or an artifact to reflect a small portion of the light. Regardless of the particular application, this multi-pulse implementation using unique characteristics provides for interrogation of the precision sensors 204 at a rate suitable for their dynamic range requirements, while the distributed system may still operate at a rate suitable for DSL.

The precision sensors 150 and 204 used in the exemplary systems 148 and 190 described with reference to FIGS. 3 and 5 generally are configured to respond to a measurand that has an appreciable dynamic component. In these systems, the use of the precision sensors 150 or 204 with the distributed system enhances the specificity of the measurand as compared with the measurement that may be obtained using the optical fiber alone. In addition, the sensitivity of the measurement may be improved since providing alternating sections of contrasting sensitivity to the measurand generally may result in a lower noise floor. Yet further, the alternating sections of contrasting sensitivity provide for a distributed system that has a substantially linear response to the measurand.

In these systems 148 and 190, examples of optical fiber precision sensors may include hydrophones, where the sensing fiber is wound onto an air-backed mandrel or other former that deforms under the action of an incident pressure wave. This type of configuration is designed to enhance the sensitivity of the optical fiber to pressure waves, while providing minimal response to other external influences, such as acceleration. Another example of an optical fiber precision sensor that may be used in the systems 148 and 190 of FIGS. 3 and 5 is an optical accelerometer which generally may include a small proof mass (e.g., a flexural disk) which is used to strain a length of optical fiber coiled and coupled to the mass. Sensors of this type typically incorporate significant lengths of fiber (e.g., 50-200 meters) and provide a highly specific response to external acceleration. Precision sensors that are based on similar principles (i.e., conversion of the measurand to strain on the optical fiber) also may be used, such as sensors that are sensitive to changing magnetic fields, electric fields, air flow, etc.

Any of these exemplary precision sensors may also be used in the system 168 of FIG. 4. However, in FIG. 4, where the precision sensors 172 are interrogated using pulses that have different characteristics than the pulses used for the distributed measurement, static measurements (e.g., temperature) may be acquired in addition to dynamic measurements. Thus, the precision sensors 172 in system 168 may be any sensor that can respond to any type of measurand that can be transduced onto the optical fiber, including precision pressure sensors, temperature sensors, etc.

Any of the systems described above may be used in a variety of applications where precision measurements in a distributed system are desired. For instance, the systems may be used in hydrocarbon production applications where the distributed vibration sensor is deployed in a wellbore to monitor various characteristics of the surrounding formation and/or hydrocarbon liquid flow. The distributed vibration sensor described herein also may be deployed in injection wells for improving hydrocarbon recovery, geothermal wells for energy extraction or storage, wells for $CO_2$ sequestration, etc. The systems also may be used in intrusion detection systems and systems for monitoring the integrity of a structure, such as a pipeline or other asset that includes volatile fluids at significant pressures and/or temperatures, as well as any other systems that may benefit from the ability to perform precision measurements in a distributed system.

In applications which monitor the integrity of structures that contain volatile fluids, the fiber optic sensor can be configured such that the high-sensitivity regions are formed as gas compositional sensors that employ photoacoustic spectroscopy to detect the presence and/or composition of a gas leak, for instance.

In general, photoacoustic spectroscopy of a gas mixture employs a modulated or pulsed laser beam that is directed into or through an acoustic resonator in which a gas mixture may be present. The modulation of the laser beam is at the resonator's resonant frequency (typically in the range of 100-500 Hz). A microphone is arranged proximate the resonator. If no optical absorption of the light emitted by the laser takes place in the resonator, then the microphone does not pick up any signal (to a first order approximation). The wavelength of the emitted laser beam may then be changed. As the wavelength is tuned over the absorption features of the gas present in the resonator, the light is partially absorbed, resulting in heating of the gas mixture at the modulation frequency. This heating in turn generates a pressure wave at the same frequency, the intensity of which can be determined by the strength of the particular absorption feature in question. In this way, the spectral absorption characteristics of the gas can be measured and, thus, the gas composition can be characterized and/or the presence of a as may be detected.

Figure 7:
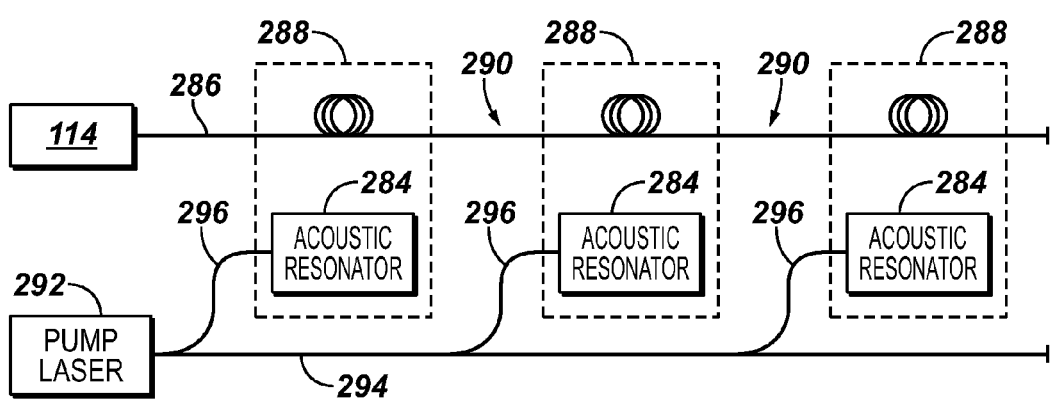
FIG. 7 illustrates yet another exemplary distributed vibration sensor with alternating sections of contrasting sensitivity to a measurand, in accordance with an embodiment of the invention.

The principles of photoacoustic spectroscopy can be applied in a system in which a distributed fiber optic sensor is deployed along a structure, such as a pipeline. For instance, with reference to FIG. 7, in such an application, portions of the structure may function as acoustic resonators 284. The distributed fiber optic sensor 286 can be wound about those portions of the structure to form microphones, thus creating high-sensitivity regions 288 that are interspaced with low-sensitivity regions 290 of unwound fiber. One end of the fiber optic sensor 286 can be coupled to the interrogation and data acquisition system 114 as described above. The pump light for the resonator portions 284 can be provided by a separate optical source 292 (i.e., a pump laser) coupled to an optical fiber 294 that has taps 296 off to each resonator 284.

As a result, the interrogation and acquisition techniques described above may be employed to detect the presence, composition, and/or direction of travel of gas leaks in the structure (i.e., by obtaining the phase difference between the backscattered light generated in low-sensitivity sections 290 of the optical fiber 286 that surround the high-sensitivity sections 288 that are wound about portions 184 of the structure or asset that contains the volatile fluid). Gas mixtures that may be readily detected in this manner include hydrogen sulfide, carbon dioxide, methane, carbon monoxide, and others. In some embodiments, the pump power may be carried on sensing fiber 286 and selectively tapped at each acoustic resonator 284 by taps similar to taps 296 illustrated in FIG. 7. In such embodiments, the taps are wavelength selective so that fractions of the pump light can be removed at each resonator 284, while leaving the probe signals and backscatter returns largely unimpeded.

As discussed above, data acquired from any of the fiber optic sensors, such as the sensors 152, 170, 200, 286, may be processed by the processing system 282, which implements appropriate algorithms to determine characteristics of the measurand of interest from the acquired data. In addition, the acquired data may be transmitted to a remote data center, if desired, for further processing, analysis, and/or storage. In some embodiments, the processing system 282 also may be used to control the optical source(s) 270 to emit optical signals at the appropriate wavelengths, frequencies, pulse widths, pulse sequences, etc. for the particular application in which the fiber optic sensors are employed.

Towards that end, the processing subsystem 282 of FIG. 5 can include a processor (or multiple processors) to perform processing and/or analysis of the measurand data and/or data representing the backscattered light from the optical fiber sensor (e.g., sensor 152). Machine-readable instructions are executable on the processor(s) to perform the processing and analysis. A processor can include a microprocessor, microcontroller, processor module or subsystem, programmable integrated circuit, programmable gate array, or another control or computing device.

Data and instructions are stored in respective storage devices, which are implemented as one or more computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components.

In the foregoing description, numerous details are set forth to provide an understanding of the present invention. However, implementations may be practiced without some or all of these details. Other implementations may include modifications and variations from the details discussed above. It is intended that the appended claims cover such modifications and variations.

What is claimed is:

1. A method of measuring a measurand in a fiber optic distributed sensor system, comprising:

providing a fiber optic distributed sensor configured to provide a distributed response along its length to a measurand of interest, the fiber optic distributed sensor having first sections interspaced with second sections, wherein each first section is located between second sections of a pair of second sections, wherein the first sections have an enhanced sensitivity to the measurand relative to the second sections; and launching optical pulses into the fiber optic distributes sensor;

determining phase differences between detected backscattered optical signals generated in the second sections of the pairs in response to launched optical pulses to determine the distributed response; and determining discrete responses from backscatter optical signals generated in the first sections in response to launched optical pulses, wherein a characteristic of the measurand is determined based on the distributed response and the discrete responses.

2. The method as recited in claim 1, wherein the detected backscattered optical signals comprise coherent Rayleigh noise.

3. The method as recited in claim 2, further comprising:
detecting coherent Rayleigh noise generated in at least a subsection fo the first section; and
using the detected coherent Rayleigh noise to assist unwrapping of the phase difference between the detected backscattered optical signals generated in the second sections of the pair between which the first section is located.

4. The method as recited in claim 1, wherein the first sections comprise coiled lengths of optical fiber coupled to a transducer.

5. The method as recited in claim 4, wherein the transducer transduces the measurand to a strain on the optical fiber.

6. The method as recited in claim 1, wherein the second sections are shielded to reduce sensitivity to the measurand.

7. The method as recited in claim 1, wherein the launched optical pulses comprise a first set of optical pulses and a second set of optical pulses, wherein the first set of optical pulses has at least one of a wavelength, frequency, and/or polarization that is different than the second set of optical pulses.

8. The method as recited in claim 1, wherein the launched optical pulses comprise a first set of optical pulses and a second set of optical pulses, wherein the first set of optical pulses has at least one of a wavelength, frequency, and/or polarization that is different than the second set of optical pulses.

9. A system comprising:
a fiber optic distributed sensor having sections of contrasting sensitivity to a measurand; and
an interrogation and acquisition system to launch optical pulses into the fiber optic distributed sensor and to detect coherent Rayleigh noise (CRN) generated in the sections of contrasting sensitivity in response to the launched optical pulses, the interrogation and acquisition system configured to determine a distributed response along the length of the fiber optic distributed sensor based on a phase difference between the CRN generated by sections of a pair of sections of lower sensitivity, where a section of high sensitivity is located between the section of the pair of sections of lower sensitivity, the interrogation and acquisition system further configured to determine individual responses along the length of the fiber optic distributed sensor based on detected CRN generated in the sections of higher sensitivity,
wherein characteristics of the measurand are determined using the individual responses to adjust the distributed response.

10. The system as recited in claim 9, wherein the sections of higher sensitivity to the measurand alternate with the sections of lower sensitivity to the measurand.

11. The system as recited in claim 9, wherein the interrogation and acquisition system is further configured to use the detected CRN generated within the sections of higher sensitivity to assist unwrapping of the phase difference.

12. The system as recited in claim 9, wherein the sections of higher sensitivity comprise discrete sensors configured to respond to the measurand.

13. The system as recited in claim 12, wherein the discrete sensors comprise coils of optical fiber coupled to transducers, and the sections of lower sensitivity comprise lengths of optical fiber that are not coupled to a transducer.

14. The system as recited in claim 12, wherein the sections of lower sensitivity are shielded from the measurand.

15. The system as recited in claim 9, wherein the interrogation and acquisition system comprises an optical source for launching first optical pulses to measure a distributed response along the length of the fiber optic distributed sensor and second optical pulses to measure individual responses from the sections of higher sensitivity.

16. The system as recited in claim 15, wherein the fiber optic distributed sensor further comprises wavelength selective elements at opposing ends of the sections of higher sensitivity.

17. The system as recited in claim 16, wherein the first optical pulses have a first wavelength and the second optical pulses have a second wavelength that is different than the first wavelength.

18. The system as recited in claim 16, wherein the wavelength selective elements are fiber Bragg gratings.

19. The system as recited in claim 9, wherein the interrogation and acquisition system comprises an optical source for launching a plurality of optical pulses into the fiber optic distributed sensor, wherein the optical pulses comprise a first set of pulses having a first characteristic and a second set of pulses having a second characteristic that is different than the first characteristic.

20. A method for making precision measurements in a distributed fiber optic sensor system, comprising:
launching a plurality of optical pulses into the distributed fiber optic sensor system;
acquiring a distributed measurement of a measurand from an optical fiber sensor configured to respond along its length to the measurand, wherein the optical fiber sensor has first sections having an enhanced sensitivity to the measurand interspaced with second sections having a reduced sensitivity to the measurand,
wherein acquiring the distributed measurement comprises:
detecting coherent Ralyleigh noice (CRN) generated by the optical fiber sensor in response to the plurality of optical pulses;
comparing phases of the detected CRN generated in second sections between which a first section is located; and
adjusting the compared phases based on detected CRN generated in the first section to determine characteristics of the measurand.

21. The method as recited in claim 20, further comprising using the detected CRN generated within the first section to guide unwrapping of a phase difference in the CRN generated between the second sections between which the first section is located.

22. The method as recited in claim 20, wherein the optical pulses comprise a first set of optical pulses having a first characteristic and a second set of optical pulses having a second characteristic that is different than the first characteristic.

23. The method as recited in claim 20 wherein the optical pulses include a first pulse having a first wavelength and a second pulse having a second wavelength, the method further comprising:
determining a distributed response along the length of the optical fiber sensor from the CRN generated in response of the first pulse; and determining individual responses from the first sections having the enhanced sensitivity from the CRN generated in response to the second pulse.

24. The method as recited in claim 20, wherein each first section includes a length of optical fiber coupled to a transducer configured to response to the measurand, and each second section includes a length of optical fiber shielded from the measurand.

25. A system to determine characteristics of a measurand detected by a distributed fiber optic sensor, comprising:
   an interrogation and data acquisition system comprising configured to launch optical pulses into the distributed fiber optic sensor:
   at least one processor; and
   at least one storage medium to store executable code that, when executed by the at least one processor, causes the interrogation and data acquisition system to:
   acquire a distributed measurement of a measurand detected by an optical fiber sensor that responds along its length to the measurand, wherein the optical fiber sensor has first regions alternating with second regions, the first regions having an enhanced sensitivity to the measurand relative to the second regions;
   detect coherent Rayleigh noise (CRN) generated by the optical fiber sensor;
   compare phases of the detected CRN generated in second regions between which a first region is located; and
   adjust the compared phases based on detected CRN generated in the first region to determine characteristics of the measurand.

26. The system as recited in claim 25, wherein the executable code, when executed by the at least one processor, further causes the interrogation and data acquisition system to use detected CRN generated with the first region to guide unwrapping of a phase difference in the CRN generated between the second regions between which the first region is located.

* * * * *